Oct. 31, 1933.   R. J. CAUGHEY   1,933,311
REGULATING MECHANISM FOR PRIME MOVERS
Filed July 29, 1932
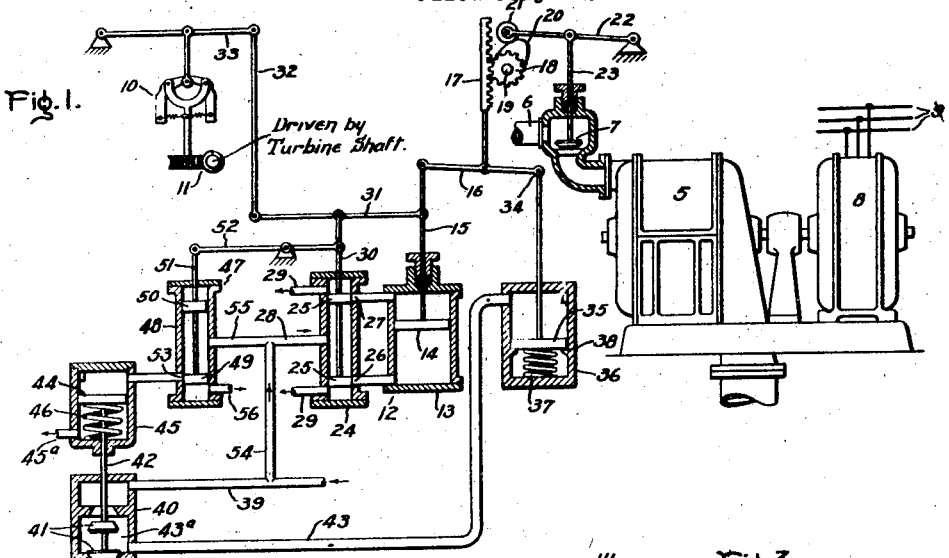
Inventor:
Reed J. Caughey,
by Charles E. Tullar
His Attorney.

Patented Oct. 31, 1933

1,933,311

UNITED STATES PATENT OFFICE 1,933,311

REGULATING MECHANISM FOR PRIME MOVERS

Reed J. Caughey, Schenectady, N. Y., assignor to General Electric Company, a corporation of New York Application July 29, 1932. Serial No. 625,837

8 Claims. (Cl. 137—158)

The present invention relates to regulating mechanism for prime movers such as elastic fluid turbines and the like in which means for controlling the supply of actuating substance to the prime mover or movers are regulated by a governor through the intermediary of a motor having a control member connected to the governor.

My invention is particularly applicable to elastic fluid turbines wherein the valve means controlling the flow of elastic fluid to the turbine is adjusted by a governor through the intermediary of a fluid actuated motor comprising a cylinder and piston and a pilot valve controlling the admission of the actuating fluid to the cylinder. It is to be understood, however, that the invention is not limited thereto necessarily.

The usual type of regulating mechanism particularly used in turbine power plants comprises a fluid actuated motor for moving the turbine valve or valves. Oil or like actuating fluid is supplied to and drained from the motor through a pilot valve which has its valve heads connected to the governor as well as to the piston of the motor by means of a follow-up mechanism.

Arrangements of this kind are generally known in the art. They operate briefly as follows: Movement of the governor, which may be due to a change in speed of the prime mover, causes the pilot valve to uncover its port or ports whereby a displacement of actuating fluid for the motor takes place to the effect that the motor piston is moved to cause movement of the valve means and through the follow-up mechanism restoring of the original position of the pilot valve head or heads. In order to maintain balanced condition in a power plant it is desirable to provide a quickly acting regulating mechanism, that is, in cases of a speed governing mechanism for controlling a valve means, the latter should respond quickly to movements of the speed governor to prevent a change in speed of more than a predetermined amount, for example — 10% of the original value.

This requirement can be met with the ordinary regulating mechanism as long as slow changes in speed occur. If, however, sudden changes take place, the motor for moving the valve means may not respond fast enough to movements called for by the governor and accordingly lags behind the governor movement.

The object of the present invention is to provide an improved regulating mechanism for prime movers and the like whereby a change in speed or like condition beyond a predetermined value is substantially prevented.

My invention is based on the restoring action of the pilot valve or control member for the motor. As long as slow changes in speed or like conditions occur the motor moves fast enough to oppose through the follow-up mechanism further movement of the pilot valve heads by the governor to the effect that the pilot valve heads move a small distance only out of their original position. If, however, sudden changes occur, the pilot valve heads move considerably beyond their original position, as in this case, the motor does not respond fast enough to the movement called for by the governor. In other words, the increased movement of the pilot valve is an indication of too slow an action of the regulating mechanism. According to my invention, the movement of the pilot valve beyond a predetermined distance is used to initiate operation of a mechanism for accelerating the movement of the valve means for the prime mover.

For a better understanding of what I consider to be novel and my invention, attention is directed to the following description and the claims appended thereto, in connection with the drawing which forms a part of the specification.

In the drawing, Fig. 1 is a view, partly diagrammatic and partly broken away, of a regulating mechanism for an elastic fluid turbine embodying my invention, and Figs. 2 and 3 show modifications of my improved regulating mechanism.

Referring to Fig. 1, 5 designates an elastic fluid turbine having an inlet 6 in which is located a valve 7 for regulating the supply of elastic fluid. The turbine is coupled with an electric generator 8 connected to an electric line 9. 10 is a governor, in the present instance shown as an ordinary flyweight governor, driven from the turbine shaft through a worm gear 11. The governor forms in substance a regulating element, whereas valve 7 forms a regulated element moved in response to the governor movement, that is, to speed change of the turbine. The valve 7 is moved by a motor which is controlled by a control member under action of the speed governor. In the present instance I have shown a hydraulic motor 12 including a cylinder 13 with a piston 14 movably arranged therein and having its stem 15 pivoted to a lever 16. The latter has an intermediate point pivotally connected to a rack 17 meshing with a gear 18 fastened to a shaft 19. Provided on this shaft is a cam 20 on which a roller 21 fastened to the left-hand end of a fulcrumed lever 22 slides. An intermediate point of lever 22 is pivoted to stem 23 of valve 7. Upward movement of piston 14 causes rack 17 to move upward, thereby turning gear 18 and cam 20 in clockwise direction to permit closing of valve 7. In a similar way, downward movement of piston 14 effects opening of valve 7. The hydraulic cylinder is controlled by a pilot valve 24 having valve heads 25 which normally cover ports 26 and 27, leading to the lower part and upper part of the hydraulic cylinder respectively. 28 is a conduit through which actuating fluid, such as oil, is supplied to the cylinder. 29 are discharge conduits for draining actuating fluid from the upper and lower part of the hydraulic cylinder. The valve heads 25 are fastened to a stem 30 which in turn is pivoted to a floating lever 31 having its right-hand end connected to piston rod 15 and its left-hand end connected through a link 32 and a fulcrumed lever 33 to the regulating element or speed governor 10.

During operation an increase in speed of the turbine causes outward movement of the weights of the speed governor whereby the right-hand end of fulcrumed lever 33 and link 32 move downwardly and effect through floating lever 31 a downward movement of the pilot valve heads whereby the latter uncover their ports and permit actuating fluid to be supplied to the lower part of the hydraulic cylinder and drained from the upper part thereof. The piston 14 thereby moves upwardly and causes, as described above, closing of valve 7. The upward movement of piston 14 also effects through floating lever 31, which forms a part of the usual follow-up mechanism, a similar upward movement of the pilot valve heads and thus causes the latter to resume their original position. A decrease in speed causes, in a similar manner, inward movement of the flyweights and, with the different parts moving in opposite direction than before, opening movement of valve 7. The mechanism so far described is typical of a usual kind of regulating mechanism in which a regulated member, such as a valve, is positioned by a regulating member, for instance a speed governor, through the intermediary of a motor and a control means for the motor.

At slow changes in speed, a slow movement of the pilot valve heads 25 and a corresponding movement of the motor piston 14 takes place. The slow movement of the latter however is sufficient to prevent the pilot valve heads from moving more than a certain distance beyond their normal positions wherein they cover ports 26 and 27. This certain distance may be in the order of 40/1000" for example.

At sudden speed changes, the movement of the pilot valve is fast, whereas that of the motor is too slow to prevent the pilot valve from moving more than a predetermined distance from its original position. As the slow movement of the motor is particularly dangerous in case the valve of an elastic fluid engine has to be closed, I provide, according to my invention, means which automatically cause acceleration of the closing movement of the valve when the motor for operating the valve lags in its movement more than a predetermined amount behind the movement of the governor. In the example shown in Fig. 1 this result is accomplished by providing a variable fulcrum for the right-hand end 34 of lever 16, which end is pivotally connected to a piston 35 of a dumping cylinder 36. The upper side of the piston under normal conditions is forced downwardly by the application of oil under pressure and the lower side of the piston is biased in upward direction by a spring means 37. Under normal operation the oil pressure is high enough to overcome the force of spring 37 and thus cause the piston 35 to engage stops 38 in the cylinder. Oil is supplied to the upper part of dumping cylinder 36 from a conduit 39 through a trip valve 40 having upper and lower valve members 41 fastened to a stem 42 and defining a chamber 43ª connected to the dumping cylinder through a conduit 43. The trip valve stem 42 is connected to a piston 44 provided in a pressure cylinder 45 and biased in upward direction by a spring 46. Oil or like actuating fluid is supplied to the upper side of piston 44 under a pressure great enough to overcome the biasing force of the spring and thus to normally maintain the trip valve in the position indicated in the drawing. 47 is a valve means including a cylinder 48 and valve heads 49, 50 fastened to a stem 51 which in turn is pivoted to the left-hand end of a fulcrumed lever 52 having its right-hand end pivotally connected to pilot valve stem 30. The arrangement is such that the lower valve head 49 of valve means 47 under normal conditions slightly uncovers port 53 connected to the upper part of cylinder 45 and thus permits the supply of actuating fluid from line 39 through conduits 54, 55. 45ª is a conduit for discharging leakage fluid from the lower part of pressure cylinder 45.

As stated above the operation of the ordinary mechanism is satisfactory as long as pilot valve heads 25 do not uncover their ports more than a predetermined amount. As soon as an increased movement of the pilot valve heads 25 occurs an acceleration of the regulated valve by the additional means takes place. For this purpose I adjust the arrangement so that pilot valve head 49 normally uncovers at its upper side the port 53 a predetermined amount, for instance 40/1000" with valve heads 25 in alignment with their ports. When valve heads 25 are moved downwardly a predetermined amount, for example 40/1000", in the example given, valve head 49 fully covers its port to prevent further supply of oil to pressure cylinder 45. If now pilot valve heads 25 move downward still further, valve head 49, being connected through fulcrumed lever 52 to valve heads 25, uncovers its port and permits oil or like actuating fluid in the upper part of pressure cylinder 45 to be drained through the drain pipe 56 provided in the lower part of pilot valve cylinder 48. Piston 44 then moves upwardly under action of spring 46, thereby effecting reversing of the trip valve so that the upper valve head 41 is forced towards its seat and prevents further supply of fluid to dumping cylinder 36, whereas lower valve head 41 of the trip valve permits the actuating fluid in the upper part of the dumping cylinder to be drained off. Piston 35 in the dumping cylinder thereby is forced upward by the biasing spring 37 to effect a rapid closing movement of valve 7. The sudden closing movement of the valve may result in overregulation, the correct position of the valve being finally determined by motor piston 14. As soon as the latter again follows the movement of the governing element, that is, when the differential movement between piston 14 and the governing element disappears and pilot valve heads 25 uncover their ports less than the predetermined amount, valve head 49 is moved downward to a position as shown in the drawing to permit actuating fluid to be supplied to the upper part of the pressure cylinder 45. The supply of fluid under pressure to this cylinder in turn causes reversing of the trip valve 41 to assume a position as shown in the drawing, resulting in the supply of actuating fluid from conduit 39 to conduit 43 into the upper part of dumping cylinder 36 whereby the latter again resumes its normal position shown in the drawing. Under the condition described above, the dumping cylinder piston is moved its full stroke, that is, from the lowermost position shown in the drawing to its uppermost position and thus acts like an emergency governor with the difference that it does not necessarily cause valve 7 to be completely closed but merely effects the latter to be moved a certain amount towards its seat. The movement of valve 7 under this condition depends upon the initial position of the valve, that is, when fully opened the valve may be moved half way towards its seat, whereas when originally half open it may be moved to engage its seat and thus the turbine if desired may be completely shut down.

We have assumed in the above example of operation that pilot valve head 49 was moved upward to sufficiently uncover its port 53 for a sufficient period of time to permit the oil in the upper part of pressure cylinder 45 to be drained through conduit 56. Let us now assume that owing to a slight lag in movement of piston 14 of the motor with respect to the governor a slight upward movement of pilot valve head 53 occurs to permit the actuating fluid in the upper part of dumping cylinder 45 to be slowly drained through conduit 56. This causes the lower valve head 41 of the trip valve to disengage its seat without causing the upper valve head to engage its seat. Under such a condition oil is still supplied from conduit 39 through the trip valve and conduit 43 to the dumping cylinder but causes a decrease in pressure on the upper side of the cylinder piston, in view of the fact that a part of the oil escapes through the lower unseated head of the trip valve. This causes the dumping cylinder piston to move upward to assume a position in which the decreased oil pressure is compensated by the decreased biasing force of the spring. The operation is in other respects the same as that described before.

In Fig. 2 I have shown a modification according to my invention. 60 designates an elastic fluid engine, for instance a turbine having admission valve means 61 regulated by a speed responsive device or governor 62 corresponding to governor 10 in Fig. 1 and driven from the turbine shaft through a worm gear 63. The flyweights of the governor are connected to a fulcrumed lever 64 which has its right-hand end pivotally connected by means of a link 65 to an intermediate point of a floating lever 66. The left-hand end of the latter is connected to the stem 67 of a control member or pilot valve 68 having an inlet 69 and an outlet 70. The right-hand end of floating lever 66 is connected to the stem 71 of a hydraulic motor 72 including a spring 73 for biasing its piston 74 in downward direction. The hydraulic cylinder and the pilot valve just described correspond to the motor and pilot valve 12 shown in Fig. 1. The motor, however, has been shown in the present instance as being single-actuated, that is, its control member has only a single conduit 75 connected to the lower part of the cylinder.

With the arrangement so far described an increase in speed of the turbine causes outward movement of the flyweights of the speed governor which effects through the follow-up mechanism 64, 65 and 66 a downward movement of the pilot valve heads to permit actuating fluid being drained from the lower part of the hydraulic cylinder 72 through conduit 75, the pilot valve and discharge conduit 70. Spring 73 thereby forces the piston downward which in turn effects through follow-up lever 66 a corresponding upward movement of the pilot valve heads to cause the latter to resume their original position in which the upper head covers its port. As in many cases the motor for moving the valves attains considerable dimensions it is necessary to provide larger pilot valves. As this might effect an accurate actuation of the pilot valve by the speed governor, I have shown in the present instance an arrangement in which two hydraulic motors are connected in series with the pilot valve of the first motor controlled by the speed governor, and the pilot valve of the second motor controlled by the first hydraulic motor. The second hydraulic motor has been designated by 76 and its pilot valve by 77. The pilot valve heads 78 are fastened to a stem 79 which is connected to a floating lever 79' which latter has one end pivotally connected to piston 74 of the first hydraulic motor and its other end to the stem 82' of a piston 82 of the second motor. During operation the downward movement of piston 74 of the first hydraulic motor causes downward movement of pilot valve head 78 to permit oil or like actuating fluid being supplied through conduit 80 to the lower part of the hydraulic motor and drained from the upper part thereof through discharge conduit 81 of the pilot valve. The piston 82 of the second hydraulic motor thereby moves upward and causes through the ordinary rack, gear and cam mechanism 83 closing of valve 61. The admission of elastic fluid to the turbine thereby decreases, resulting in a decrease in speed of the latter. The upward movement of piston 82 also causes the pilot valve 78 to resume its original position.

The mechanism so far described may be used for controlling regulating members such as valves for an elastic fluid turbine. Its operation is satisfactory as long as slow changes in speed or like condition of the turbine affecting the regulating member occur. If sudden changes of these conditions, however, take place the regulating member moves rapidly and the second hydraulic motor 82 which may be termed a power agency for moving the regulated member or valve cannot follow. The restoring action of pilot valve 77 of the second hydraulic motor therefore lags and the pilot valve heads uncover their ports more than at slow changes of existing conditions, thereby indicating too slow an action of the regulating mechanism.

As in the arrangement described in Fig. 1, I provide means for initiating an accelerated action of the regulating mechanism if at increasing speed the pilot valve heads uncover their ports more than a predetermined amount.

The means for initiating the accelerated movement of the valves have been shown in Fig. 2 as being the same as those in Fig. 1, that is, they include a valve means 84 pivotally connected through a fulcrumed lever 85 to stem 79 of pilot valve 77. Valve 84 includes a head 86 which under normal conditions, that is, with the valve heads 78 in alignment with the ports, slightly uncovers the upper part of a port 87 leading to a pressure cylinder 88 to permit the supply of fluid under pressure to the latter. A piston 89 is provided in cylinder 88 with its stem 90 connected to a trip valve 91. 92 is a spring for biasing piston 89 in upward direction against the fluid pressure. With valve head 86 in the position shown in the drawing, oil or like actuating fluid is supplied through conduits 93, 80 and 87 to the upper part of the pressure cylinder 88. The piston in the latter is forced downward and effects the upper head of trip valve 91 to engage its seat and the lower head to assume open position. Valve 84, pressure cylinder 88 and trip valve 91 may be considered as forming in substance a means for initiating an accelerated movement of the hydraulic motor 76 in response to the position of pilot valve head 78. Whereas in the embodiment shown in Fig. 1 the means for accelerating the movement of the regulated member act directly upon said member, I have shown in Fig. 2 an arrangement in which the means for accelerating the movement of valve 61 act upon the hydraulic motor 76 itself, that is, indirectly on the regulated member. In the present instance I have shown an arrangement for increasing the pressure of the actuating fluid supplied to the hydraulic motor when the pilot valve heads 78 assume a certain predetermined position. 94 designates a pumping means for providing the normal supply of actuating fluid through conduit 93 to the hydraulic motor 76, as well as the pressure cylinder 88. 95 is a pressure valve such as a poppet valve which opens at excessive fluid pressure. According to my invention I provide a second pump shown at 96 which normally pumps oil or like actuating fluid through the left-hand part of casing 97 and discharges the oil through the lower opened trip valve into a chamber 98. 99 is a pressure relief valve for pump 96. The casing 100 for the trip valve and the two pumps with the pressure relief valves has been indicated as a single unit. During normal operation of the mechanism oil is supplied from pump 94, through conduits 93, 80 and 87 to the upper part of pressure cylinder 88. Oil leaking along the walls of this cylinder into the lower part thereof is discharged through a conduit 101. If now, owing to a rapid movement of the speed governor, the pilot valve head 78 uncovers its port more than a predetermined amount, which may be in the order of 40/1000″ as in the example described with respect to Fig. 1, lever 85 causes sufficient upward movement of valve head 86 to disconnect cylinder 88 from its source of supply, permitting oil of the pressure cylinder to be drained through the lower part of valve 84 and conduit 87. This causes piston 89 of the pressure cylinder to move upward under action of biasing spring 92, resulting in reversing of the trip valve. The upper trip valve head disengages its seat whereas the lower one is moved towards its seat. Oil from pump 96, which may be termed an auxiliary means of fluid supply thereby is conveyed into the right-hand end 102 of casing 100, increasing the fluid pressure caused by pump 94. This effects an increased or accelerated supply of actuating fluid to the lower part of hydraulic motor 76, resulting in an accelerated upward movement of piston 72 and accordingly an accelerated closing movement of valve 61. The rate of acceleration depends upon the differential movement between piston 82 and governor 62. Thus, if the turbine for instance suddenly loses its load, the lower pilot valve 78 fully uncovers its port and through fulcrumed lever 85 causes valve head 86 to move upward to completely uncover its port permitting a rapid discharge of oil from pressure cylinder 88. Piston 89 of the pressure cylinder thereby effects complete reversing of the trip valve whereby the lower trip valve head engages its seat and a considerable increase in pressure in the right-hand portion 102 of casing 100 is effected, resulting in a rapid upward movement of piston 82 and accordingly a rapid closing movement of valve 61.

In Fig. 3, where I have shown another arrangement for carrying out my invention, 106 is a turbine having an admission valve 107 which is moved through the ordinary rack, gear and cam mechanism 108. 109 is a speed governor driven through a worm gear 110 from the shaft of the turbine and connected through lever 111 and link 114 to the floating lever 115 of hydraulic motor 116 comprising a cylinder 117 and a pilot valve 118 corresponding to parts 64 to 72 inclusive of Fig. 2. Motor 116 with control member 118 forms an auxiliary or first hydraulic motor and serves for moving the pilot valve 119 of a second hydraulic motor 120. The hydraulic motor 120 corresponds to motor 76 of Fig. 2 but differs from the latter by a special arrangement for its piston 121 which comprises an upper part 122 of a cross section corresponding to the cross section of the cylinder, and a lower part 123 of a smaller cross section slidably engaging the walls of a hole in an annular partition 124 of the cylinder. With such a piston arrangement less oil is necessary to move the piston in one direction than in the other, in the present instance less oil being necessary to move the piston upward for closing the valve than to move it downward for opening it. For accelerating the closing movement of the regulated member or valve when the position of the second pilot valve 119 indicates a too slow movement of the motor, I provide in this instance a valve 125 having a head 126 which normally slightly uncovers with its upper face a port 127 leading to a pressure cylinder 128. The latter includes a piston 129 biased by a spring 130 against the downward pressure of a fluid under pressure. The piston stem is connected to a valve 131 which normally closes an outlet 132 of conduit 133 for connecting pilot valve 119 with the upper part of hydraulic motor 120.

The operation of the governor together with the first and second hydraulic motor is substantially the same as that described in Fig. 2 except, as already mentioned, the second hydraulic motor 120 requires less actuating fluid for moving its piston in one direction than in the other. Oil or like actuating fluid is supplied through a conduit 134 and auxiliary valve 125 into the upper part of the pressure cylinder to normally maintain valve 131 closed. The valve stem 135 is connected through a fulcrumed lever 136 to stem 138 of the control member or pilot valve of the second hydraulic motor. Movement of stem 138 therefore is transmitted through fulcrumed lever 136 to stem 135 of the auxiliary valve.

During operation, if valve 119 of the second hydraulic motor uncovers at increasing speed its port more than a predetermined value, valve head 127 is moved upward, shutting off the supply of actuating fluid from conduit 134 to pressure cylinder 128, and at the same time permitting oil from the pressure cylinder to be drained through a conduit 139. Piston 129 of the pressure cylinder thereby is moved upward under action of the biasing spring, opening valve 131 which in turn permits the fluid contained in the upper part of the second hydraulic motor to be rapidly discharged. Motor piston 122, 123 is thereby moved upward at accelerated motion and causes accelerated closing of valve 107. As soon as control member 119 for the second hydraulic motor assumes a position within the predetermined limit, head 126 for the auxiliary valve is moved downward and again permits oil to be supplied to the pressure cylinder which in turn causes closing of valve 131.

With my arrangement I have provided a reliable control mechanism for valves and like members to be regulated in which the lag in action between the valve or the motor moving the valve and the regulating member is considerably decreased. With the use of my improved control mechanism for regulating elastic fluid turbines by means of a speed responsive device, I prevent the speed of the turbine from increasing at sudden loss of load beyond certain values which may be 10% or less depending upon the dimensioning of the different apparatus. In the arrangement shown in Fig. 1 this effect is accomplished by providing auxiliary means for directly closing the valve, and in the arrangements of Figs. 2 and 3 I have shown means for directly accelerating the movement of the hydraulic motor piston which with respect to Fig. 2 include means for causing an accelerated supply of actuating fluid and with respect to Fig. 3 include means for causing an accelerated draining of actuating fluid from the motor if the rate of speed change of the turbine exceeds a certain predetermined value.

Having described the method of operation of my invention together with apparatus which I now consider to represent the best embodiments thereof, I desire to have it understood that the apparatus shown are only illustrative and that the invention may be carried out by other means.

What I claim as new and desire to secure by Letters Patent of the United States, is:

1. The combination with a regulated element, a motor for moving the element, a control member for controlling the motor, and a governor for moving the control member, of means for accelerating the movement of the regulated element in response to movement of the control member, said means comprising a valve having a port and a valve head pivotally connected to the control member and normally uncovering the port a predetermined amount.

2. The combination with a regulated element, a motor for moving the element, a control member for controlling the motor, and a mechanism including a governor for moving the control member, of means for accelerating the movement of the regulated element in response to the relative movement between the governor and the motor, said means comprising a pressure cylinder, a valve having a port for conducting fluid under pressure to the pressure cylinder and a movable valve member pivotally connected to the control member and uncovering said port a predetermined amount during normal operation.

3. The combination with an elastic fluid engine having valve means for regulating the supply of elastic fluid thereto, a speed governor driven by the engine, a control member moved by the speed governor, and a motor controlled by the control member for moving the valve means, of means for accelerating the movement of said valve means in response to the relative movement between the speed governor and the motor, said means including another valve means normally uncovering its port a predetermined amount and being directly connected to and moved in proportion to the movement of the control member, a pressure cylinder and means including the other valve means for supplying fluid to the pressure cylinder.

4. The combination with an elastic fluid engine having valve means for regulating the supply of elastic fluid thereto, a speed governor driven by the engine, a control member moved by the speed governor, and a motor controlled by the control member for moving the valve means, of means for accelerating the movement of said valve means towards closing position when the control member reaches a predetermined position, said accelerating means including a dumping cylinder having a piston connected to the valve means, a source of supply of actuating fluid for the dumping cylinder and means for shutting off the source of supply and permitting actuating fluid being discharged from the cylinder in response to the position of the control member.

5. The combination with an elastic fluid engine having valve means for regulating the supply of elastic fluid thereto, a speed governor driven by the engine, a pilot valve moved by the speed governor, a hydraulic motor controlled by the pilot valve for moving the valve means, and means for supplying actuating fluid to the hydraulic motor, of means for accelerating the movement of the valve means towards closing position when the pilot valve moves beyond a predetermined position, said accelerating means including an auxiliary means of fluid supply for the hydraulic motor and means for regulating the supply of actuating fluid from the auxiliary means to the motor.

6. The combination with an elastic fluid engine having valve means for regulating the supply of elastic fluid thereto, a speed governor driven by the engine, a pilot valve moved by the governor, and a hydraulic motor controlled by the pilot valve for moving the valve means, of means for accelerating the movement of the valve means when the relative movement between the motor and the governor exceeds a predetermined value, said accelerating means including a conduit for connecting the pilot valve with the hydraulic motor, a valve in the conduit and means for opening the normally closed valve when the pilot valve moves beyond a predetermined position.

7. The combination with an engine having valve means for controlling the supply of fluid thereto, of a hydraulic motor for moving the valve means, the motor including a cylinder having a partition therein and a piston movably arranged in the cylinder and having an upper part slidably engaging the walls of the cylinder and a lower part of smaller diameter than the upper part and slidably engaging the walls of a hole in the partition, and means for supplying and discharging actuating fluid from the upper and lower part of the cylinder, whereby less actuating fluid is necessary to move the piston in one direction than in the other.

8. The combination with an elastic fluid turbine having valve means for regulating the flow of elastic fluid thereto, a fluid actuated motor and pilot valve for effecting movement of the valve means, and a governor for effecting movement of the pilot valve, of means responsive to movement of the pilot valve beyond a predetermined amount for effecting an accelerated movement of the valve means, said means comprising another pilot valve pivotally connected to the first named pilot valve and having a valve head normally uncovering its port a predetermined amount.

REED J. CAUGHEY.